US010746263B2

(12) United States Patent
Schneidewind

(10) Patent No.: US 10,746,263 B2
(45) Date of Patent: Aug. 18, 2020

(54) AUTOMATIC TRANSMISSION WITH ELECTRIC SYNCHRONIZATION

(71) Applicant: TOYOTA MOTOR ENGINEERING & MANUFACTURING NORTH AMERICA, INC., Erlanger, KY (US)

(72) Inventor: Brian C. Schneidewind, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 46 days.

(21) Appl. No.: 15/422,831

(22) Filed: Feb. 2, 2017

(65) Prior Publication Data

US 2018/0163826 A1 Jun. 14, 2018

Related U.S. Application Data

(60) Provisional application No. 62/433,015, filed on Dec. 12, 2016.

(51) Int. Cl.
*F16H 3/78* (2006.01)
*F16H 3/66* (2006.01)
*F16H 61/04* (2006.01)
*F16H 3/44* (2006.01)

(52) U.S. Cl.
CPC .............. *F16H 3/78* (2013.01); *F16H 3/663* (2013.01); *F16H 61/0403* (2013.01); *F16H 2003/442* (2013.01); *F16H 2003/445* (2013.01); *F16H 2061/0422* (2013.01); *F16H 2200/0065* (2013.01); *F16H 2200/201* (2013.01); *F16H 2200/2023* (2013.01); *F16H 2200/2046* (2013.01); *F16H 2200/2064* (2013.01); *F16H 2200/2094* (2013.01); *F16H 2306/48* (2013.01)

(58) Field of Classification Search
CPC combination set(s) only.
See application file for complete search history.

(56) References Cited

U.S. PATENT DOCUMENTS

| 6,676,563 B2 | 1/2004 | Katou |
| 7,288,040 B2 | 10/2007 | Baasch et al. |
| 8,151,662 B2 | 4/2012 | Fitzgerald et al. |

(Continued)

FOREIGN PATENT DOCUMENTS

WO  WO 2014/102855 A1  7/2014

*Primary Examiner* — Timothy Hannon
(74) *Attorney, Agent, or Firm* — Oblon, McClelland, Maier & Neustadt, L.L.P.

(57) ABSTRACT

An automatic transmission and a method of synchronization are described. The automatic transmission includes a plurality of planetary gear sets, a plurality of dog clutches and a plurality of brakes coupled to the plurality of planetary gear sets, and an electric machine coupled to the plurality of dog clutches and a plurality of brakes via the planetary gear sets. Further, the automatic transmission includes a first speed sensor measuring a first speed of the electric machine and a second speed sensor measuring a second speed of an output shaft, and a synchronization controller configured to receive the first speed sensor data and the second speed sensor data, determine a synchronization speed, and adjust the first speed of the electric machine to the synchronization speed.

11 Claims, 18 Drawing Sheets

(56) References Cited

U.S. PATENT DOCUMENTS

| | | | |
|---|---|---|---|
| 8,187,130 B1* | 5/2012 | Mellet | F16H 3/725 |
| | | | 475/276 |
| 8,617,022 B1 | 12/2013 | Vernon et al. | |
| 8,800,400 B2 | 8/2014 | Takahashi et al. | |
| 8,951,160 B2 | 2/2015 | Vernon et al. | |
| 9,228,656 B1 | 1/2016 | Schmidt et al. | |
| 9,267,553 B2 | 2/2016 | Mordukhovich | |
| 9,327,713 B2 | 5/2016 | Kaltenbach | |
| 2010/0120582 A1* | 5/2010 | Reith | F16H 61/0403 |
| | | | 477/87 |
| 2013/0196807 A1* | 8/2013 | Ziemer | B60K 6/365 |
| | | | 475/5 |
| 2013/0196808 A1* | 8/2013 | Ziemer | B60K 6/365 |
| | | | 475/5 |
| 2013/0296097 A1* | 11/2013 | Borntraeger | F16H 3/66 |
| | | | 475/276 |
| 2014/0073474 A1* | 3/2014 | Maurer | F16H 3/66 |
| | | | 475/279 |
| 2014/0144744 A1* | 5/2014 | Hirawaki | F16D 23/02 |
| | | | 192/69.9 |
| 2014/0248987 A1* | 9/2014 | Griesmeier | B60K 6/48 |
| | | | 475/151 |
| 2014/0298790 A1 | 10/2014 | Oita et al. | |
| 2015/0133258 A1* | 5/2015 | Beck | F16H 3/66 |
| | | | 475/275 |
| 2015/0167789 A1* | 6/2015 | Beck | F16H 3/66 |
| | | | 475/149 |
| 2015/0167794 A1* | 6/2015 | Morio | F16H 3/78 |
| | | | 475/5 |
| 2015/0330481 A1* | 11/2015 | Griesmeier | F16H 3/725 |
| | | | 475/5 |
| 2016/0102759 A1 | 4/2016 | Schmidt et al. | |
| 2016/0230849 A1* | 8/2016 | Haupt | F16H 3/66 |
| 2016/0339777 A1* | 11/2016 | Goleski | B60K 6/547 |

* cited by examiner

|   | C1 | C2 | C3 | B1 | B2 | B3 | Ratio | Step |
|---|---|---|---|---|---|---|---|---|
| 1 |   | ● |   |   | ● | ● | 4.809 | 1.705 |
| 2 |   | ● |   | ● |   | ● | 2.821 | 1.456 |
| 3 | ● | ● |   |   |   | ● | 1.937 | 1.433 |
| 4 |   | ● | ● |   |   | ● | 1.351 | 1.351 |
| 5 | ● | ● | ● |   |   |   | 1.000 | 1.188 |
| 6 |   | ● | ● | ● |   |   | 0.842 | 1.143 |
| 7 |   | ● | ● |   | ● |   | 0.736 | 1.178 |
| 8 |   |   | ● | ● | ● |   | 0.625 | 1.167 |
| 9 | ● |   | ● |   | ● |   | 0.536 | Total |
| R | ● |   |   |   | ● | ● | -4.358 | 8.977 |

FIG. 2

AUTOMATIC TRANSMISSION WITH ELECTRIC SYNCHRONIZATION

CROSS REFERENCE TO RELATED APPLICATIONS

This application is based on, and claims the benefit of priority to, provisional application No. 62/433,015, filed Dec. 12, 2016, the entire contents of which are incorporated herein by reference.

BACKGROUND

Field of the Disclosure

This disclosure relates generally to improvement in an automatic transmission. More particularly, improvements related to efficiency of the automatic transmission by replacing the hydraulic components with an electric machine.

Description of the Related Art

Conventionally, automatic transmissions include five or more speeds that can upshift or downshift automatically as a vehicle accelerates or decelerates. Thus, improving driving experience as no manual gear shifting is necessary. However, as the number of speeds within these multi-speed automatic transmissions increases, problems of packaging components within a transmission arises, hindering assembly of the transmission into a vehicle.

Automatic transmissions generally include at least one planetary gear set and a plurality of shift elements. The shift elements selectively engage components of the planetary gear sets in order to hinder or prevent rotation of the components. Selective actuation of the shift elements adjusts the gear ratio of the automatic transmission and shifts the automatic transmission between its various gears.

Typically, shift elements are wet clutches that utilize electro-hydraulics to operate. The electro-hydraulic system is complex and contributes to significant transmission loss. Transmissions utilizing wet clutches and related hydraulic components can account for up to 40% of the transmission drag losses while driving. As such, loss of efficiency due to hydraulic components is very high. Also, the hydraulic components are heavy and bulky.

Certain automatic transmissions include shifting elements such as dog clutches. During various gear shifts, a dog clutch is engaged or disengaged. However, engaging the dog clutch poses certain challenges. For example, the dog clutch must be generally synchronized prior to engaging the dog clutch. When the dog clutch is synchronized, components of the dog clutch rotate at a common speed and may engage each other more easily. Conversely, such components may grind against each other and be damaged if the dog clutch is engaged while the dog clutch is not synchronized. However, synchronizing the dog clutch can be difficult and time consuming.

The state-of-the art transmissions, such as ZF 9HP, utilize two dog clutches. The existing transmissions rely on controlling speed of the internal combustion engine to synchronize speeds. This results in a slower, less accurate speed synchronization which has led to customer complaints for slower shift speed and jerky or bumpy feel during shifting. Furthermore, such transmissions rely on slipping provided by wet clutches to achieve synchronization.

There remains a continuing need to provide a faster shifting, compact and highly efficient automatic transmissions. So, the hydraulic components (e.g., wet clutch discs/plates, clutch pistons, balancer pistons, return springs, valve-body, solenoids. etc.) necessary to shift gears need to be replaced.

SUMMARY

According to an embodiment of the present disclosure, there is provided an automatic transmission. The automatic transmission includes a plurality of planetary gear sets, a plurality of dog clutches coupled to the plurality of planetary gear sets, a plurality of brakes coupled to the plurality of planetary gear sets, an electric machine coupled to a the plurality of dog clutches and a plurality of brakes via the planetary gear sets. Further, the automatic transmission includes a first speed sensor measuring a first speed of the electric machine and a second speed sensor measuring a second speed of an output shaft, and a synchronization controller configured to receive the first speed sensor data and the second speed sensor data, determine a synchronization speed, and adjust the first speed of the electric machine to the synchronization speed.

Further, according to an embodiment of the present disclosure, there is provided a method of synchronization for the automatic transmission including an electric machine. The method includes receiving, via a network, speed data from speed sensors, detecting, using the processing circuitry, whether a shifting is initiated, determining, using the processing circuitry, a shifting pattern, determining, using the processing circuitry, a synchronization speed corresponding to the shifting pattern, determining, using the processing circuitry, a time to initiate synchronization, transmitting, via the network, a control signal to adjust the speed of the electric machine to achieve the synchronization speed, and transmitting, via the network, a completion signal to complete the shifting pattern.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 2 is a chart describing a shifting pattern for the automatic transmission according to an exemplary embodiment of the present disclosure;

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details.

It is to be understood that terms such as "left," "right," "top," "side," "length," "lower," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "proximate," "minor," and similar terms generally refer to ranges that include the identified value within a margin of 10% or preferably 5% in certain embodiments, and any values therebetween.

Figure 1A:
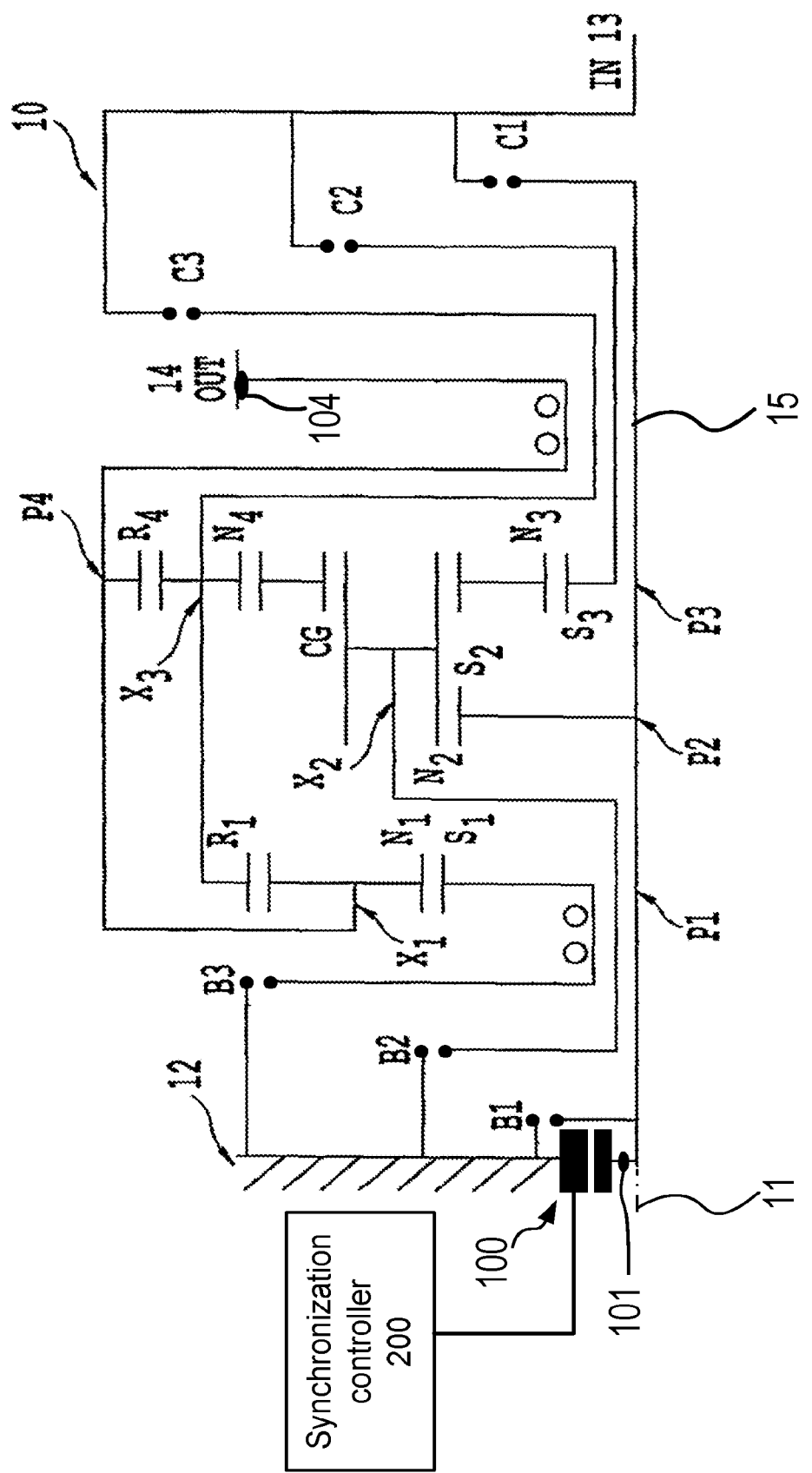
FIG. 1A is a schematic view of an exemplary automatic transmission with an electric machine connected to an intermediate shaft according to an exemplary embodiment of the present disclosure.
Figure 1B:
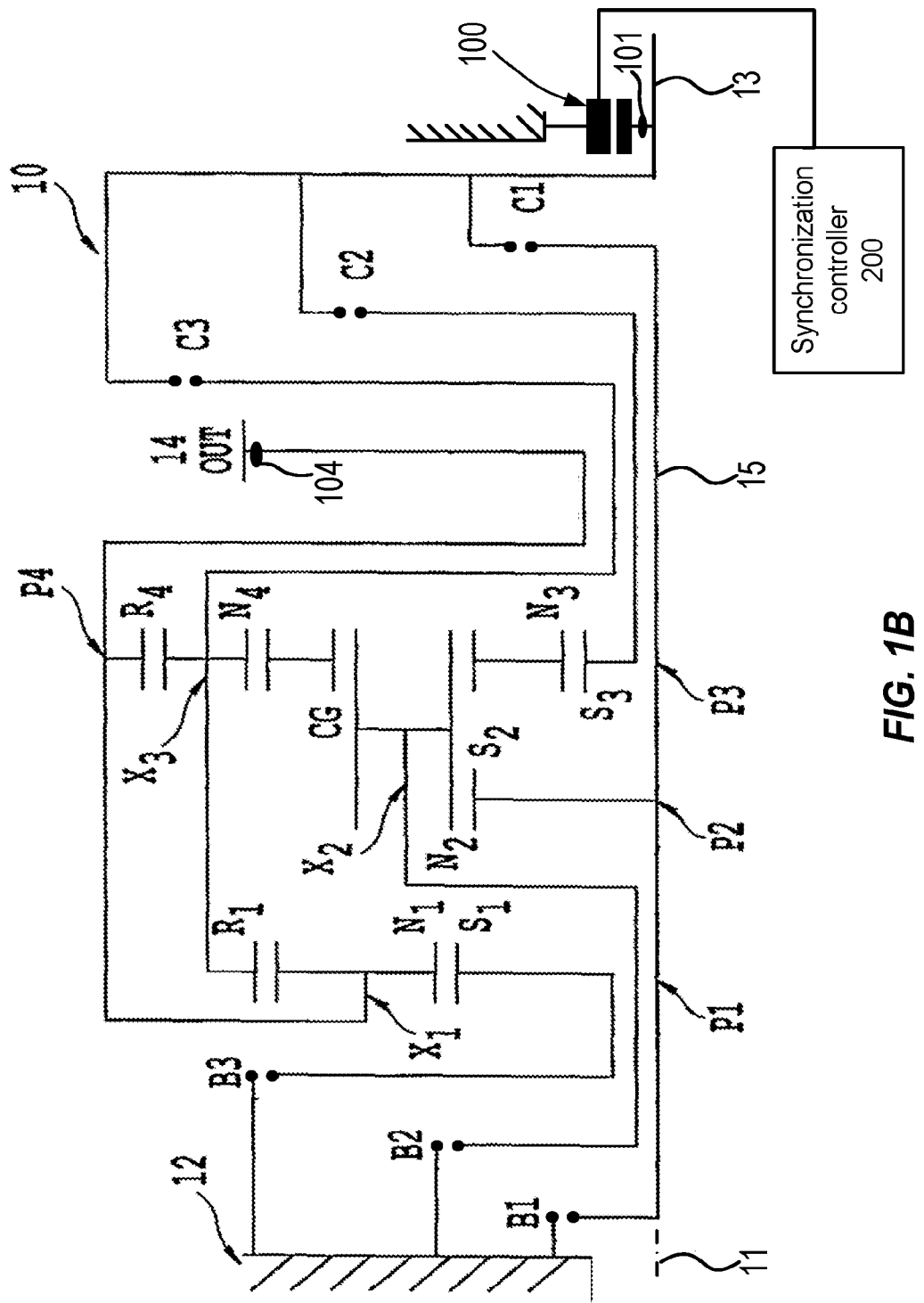
FIG. 1B is a schematic view of an exemplary automatic transmission with an electric machine connected to an input shaft according to an exemplary embodiment of the present disclosure.

FIGS. 1A and 1B are a schematic view of an exemplary automatic transmission 10 with an electric machine 100 according to an exemplary embodiment of the present disclosure. The automatic transmission 10 can operate at multiple speeds (e.g., nine forward speeds and a reverse speed) and transition back and forth between different speeds. A shifting from one forward speed to another is a complex process requiring precise synchronization between different rotating elements of the automatic transmission 10.

The automatic transmission 10 can be used, for example, to transmit rotational output derived from an engine to wheels of a vehicle at varying speeds. The output of the engine can be connected to a turbine (not illustrated) of a torque converter (not illustrated) that is rotationally driven by the engine. The torque converter can be further connected to an input shaft 13 of the automatic transmission 10, thus transmitting and converting engine output into rotational input to the automatic transmission 10. The rotational input at the input shaft 13 is then converted to rotational output at an output shaft 14 at varying speed by the components of the automatic transmission 10.

The automatic transmission 10 includes a plurality of planetary gear sets, an electric machine 100, a plurality of brakes including a first brake B1, a second brake B2, and a third brake B3, and a plurality of dog clutches including a first dog clutch C1, a second dog clutch C2 and a third dog clutch C3, and a synchronization controller 200. A dog clutch, according to present disclosure, can be any on/off type of clutch having two rotating elements that must be synchronized before engaging. In an on-state (or engaged), the two rotating elements rotate at same speed and allows transmission of power between the two rotating elements. In an off-state (or disengaged), the two rotating elements are separated from each other, can rotate at different speed and do not transmit power between the rotating elements. A brake, according to the present disclosure, can be any device that includes a stationary element which causes a rotating element to stop. The brake can be in engaged or disengaged state. Before engaging, the rotating element must be synchronized with the stationary element.

The components of the automatic transmission 10 can be supported on one or more shafts coaxially arranged along a common axis 11 in a transmission case 12 attached to a vehicle body. For example, an intermediate shaft 15 is co-axially aligned between the input shaft 13 and the output shaft 14 on which the planetary gears can be mounted. The intermediate shaft 15 rotates at a speed depending on the shifting pattern. For example, when C1 is engaged, the intermediate shaft 15 rotates at the same speed as the input shaft 13. But, when the first brake B1 is engaged, the intermediate shaft 15 is stopped even though the vehicle is moving.

The electric machine 100 can be any electrically driven machine such as a 3-phase induction motor coupled to a rotating component of the automatic transmission 10. The electric machine 100 can be a large electric motor connected to an alternator, an inverter and power electronics that derives power from an engine. Alternatively, the electric machine 100 can be a small and compact motor powered by a battery.

The electric machine 100 controls the rotation of a rotating element (e.g., a sun gear) of the plurality of planetary gear sets. The electric machine 100 can increase or decrease the speed of the rotating element (e.g., the sun gear) to bring it to a desired speed (i.e., a synchronization speed). At such speed, one rotating element will be synchronized with a second rotating element (e.g., a carrier gear or a ring gear) during the shifting process. For example, the electric machine 100 can control the speed of S2 in FIG. 1A or S3 in FIG. 1B to achieve the synchronization speed. The electric machine 100 can control the speed of the rotating element in a clockwise or an anticlockwise direction. The electric machine 100 is engaged only during the shifting process. However, the electric machine 100 can allow the rotating elements to rotate freely, when there is no shifting. The electric machine 100 can be controlled by a synchronization controller 200 based on the speed of the rotating elements to be synchronized.

The electric machine 100 receives a control signal from the speed controller 200 to control the speed of the shaft (e.g., input shaft 13). The speed controller 200 determines a synchronization speed based on the speed data received from speed sensors. The speed sensors can be coupled to the input shaft 13, an intermediate shaft 15, the output shaft 14, the electric machine 100, or a combination thereof.

The synchronization speed is a relative speed between the two elements of the dog clutch or the brake at which the engagement/disengagement of a dog clutch and/or a brake occurs for smooth shifting. In case of dog clutches, the synchronization speed or the relative speed between two rotating element is substantially zero, while the rotating elements itself are rotating at non-zero speed. In case of brakes, the synchronization speed or the relative speed between the stationary element and the rotating element is substantially zero. The synchronization speed can be a first sync speed or a second sync speed. The first sync speed can be a zero rotational speed to allow engaging or disengaging of at least one of the brakes B1-B3. For example, the first sync speed can be achieved by adjusting the speed of a third sun gear S3 of a third planetary gear set P3 via the electric machine 100. The engaging or disengaging of at least one of the brakes B1-B3 is determined based on the shifting pattern defined in FIGS. 2 and 3.

The synchronization speed can be the second sync speed, a rotational speed greater than zero to allow engaging or disengaging of at least one of the dog clutches C1-C3. The second sync speed can be achieved by adjusting the speed of the third sun gear S3 of the third planetary gear set P3 via the electric machine 100. The engaging or disengaging of at least one of the dog clutches C1-C3 is determined based on a shifting pattern defined in FIGS. 2 and 3

The synchronization speed for shifting from one speed to another (e.g., from the first to the second forward speed) can vary. The synchronization speed can vary depending on type of automatic transmission, for example, a six speed or a nine speed transmissions. The synchronization speeds can depend on parameters such as geometry of the planetary gear sets, number of teeth of the gears, a type of dog clutch, number of teeth of a dog clutch or other design parameters. According to the present disclosure, the synchronization speed can be predetermined by tuning the shifting based on the factors such as jerk or vibration during shifting, speed of the third sun S3 at which a second sun S2 and/or a second carrier X2 has a zero speed, or other appropriate synchronization speed conditions.

The electric machine 100 is always rotating when the automotive transmission 10 is in operation. As such, the electric machine 100 by itself cannot be connected to braking components such as the second brake B2 and the third brake B3 that may cause the electric machine 100 to stop during shifting process (e.g., from the first forward speed to the second forward speed). However, if more than one electric machine is included in the automatic transmission 10, then a first electric machine can be coupled to the second brake B2 and/or the third brake B3, while a second electric machine can be used for synchronizing the speeds of two rotating components.

Figure 1C:
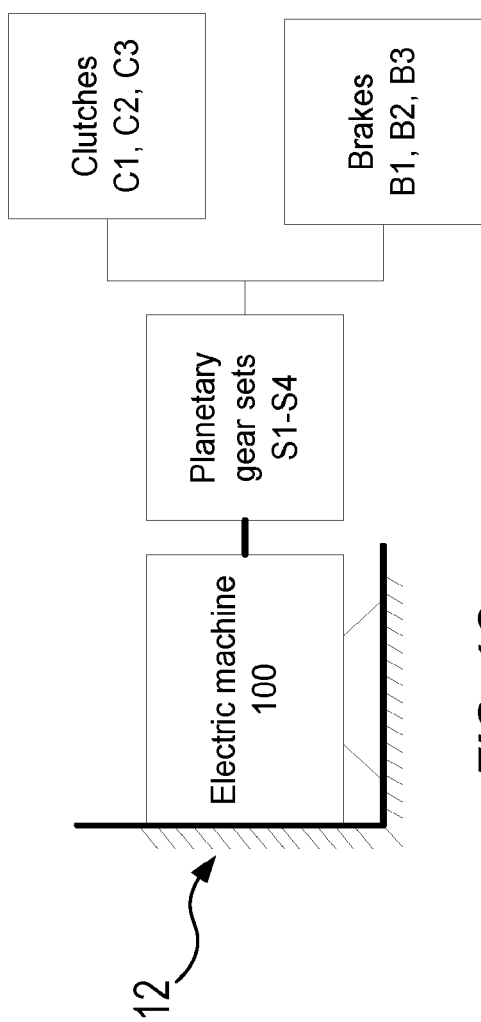
FIG. 1C is block diagram of the electric machine on the intermediate shaft connected to dog clutches and brakes according to an exemplary embodiment of the present disclosure.

The electric machine 100 can be installed at various locations to achieve synchronization of the dog clutches C1-C3 or the brakes B1-B3 via the plurality of planetary gear sets. The planetary gear sets allow selective engagement and disengagement of one or more of the dog clutches C1-C3 and/or the brakes B1-B3. For example, the electric machine 100 can be coupled to the first dog clutch C1 (see FIG. 1C) or the first brake B1. However, the electric machine 100, by itself, cannot be coupled to the second brake B2 and the third brake B3, as they may cause the electric machine 100 to stop. For example, when switching from the first forward speed to the second forward speed (see FIG. 2), the third brake B3 stays engaged, which will cause the electric machine 100 to stop from rotating. Alternatively or in addition, referring to FIG. 1B, the electric machine 100 can also be coupled to an input shaft 13 to control the speed of the input shaft 13, which is driven by an engine of the vehicle.

The dog clutches C1-C3 or the brakes B1-B3 can be any device that can be in on (engaged) or off (disengaged) state. For example, the dog clutches can be two splined shafts (one solid with outer splines and other hollow with inner splines) that can slide linearly towards each other to engage or away from each other to disengage. Alternatively, the dog clutches can be multimode clutches that can operate radially (e.g., multi-mode clutch by BORG WARNER).

The speed of the dog clutches C1-C3 or the brakes B1-B3 can be ramped up or down before engaging or disengaging. Thus, the dog clutches C1-C3 or the brakes B1-B3, according to present disclosure, do not utilize slipping or sliding (conventionally provided by wet clutches) to match the speed of the rotating components during engagement or disengagement. The dog clutches C1-C3 once synchronized can allow selective engagement/disengagement of one or more gears of the plurality of planetary gears.

An example of the plurality of planetary gear sets of the automatic transmission 10 is described in detail as follows. The planetary gear sets can include a first planetary gear set P1, a second planetary gear set P2, the third planetary gear set P3, a fourth planetary gear set P4. A planetary gear set can include a carrier connected to planet gears that rotate around a sun gear. Furthermore, the planet gears are surrounded by a ring gear (or an annular gear) with the sun gear at the center of the ring gear. Thus, the planet gear (or planet) engages on the inner side of the ring gear (or ring) and on the outer side of the sun gear (or sun).

For example, the first planetary gear set P1 includes a first carrier X1 connected to a first planet N1 that can rotate around a first sun S1 and inside the first ring R1. Similarly, the second planetary gear set P2 includes a second carrier X2, a second planet N2, a second sun S2, a second ring R2; the third planetary gear set P3 includes a third carrier X3, a third planet N3, a third sun S3, a third ring R3; and the fourth planetary gear set P4 includes a fourth carrier X4, a fourth planet N4, a fourth sun S4, a fourth ring R4.

The planetary gear sets P1 to P4 are each axially arranged on the common axis line 11 in the automatic transmission

10. The first and the second planetary gear sets P1 and P2 are separately arranged in respective first and second gear set planes. The third and the fourth planetary gear sets P3 and P4 are arranged in a third gear set plane that is separate from the first and the second gear set planes. The third planetary gear set P3 and the fourth planetary gear set P4 are concentrically arranged with the third planetary gear set P3 being radially inward of the fourth planetary gear set P4. Thus, the second gear set plane is axially positioned between the first and the third gear set planes, and the third gear set plane is a closest of the gear set planes to the input shaft 13 side of the automatic transmission.

The first planetary gear set P1 is composed of a first sun S1 rotatably supported on the common axis line 11, the first carrier X1 rotatably supporting the first planet N1, and the first ring R1 that meshes with the first sun S1 through the first planet N1.

The second planetary gear set P2 is composed of a second sun S2 rotatably supported on the common axis line 11, the second carrier X2 rotatably supporting the long second planet N2, and a common gear CG that meshes with the second sun S2 through the long second planet N2.

The third planetary gear set P3 is composed of a third sun S3 rotatably supported on the common axis line 11, the second carrier X2 rotatably supporting the long second planet N2, the short third planet N3, and the common gear CG that meshes with the third sun S3 through the long second planet N2 and the short third planet N3. An axial length of the long second planet N2 is longer than an axial length of the short third planet N3. The second planetary gear set P2 and the third planetary gear set P3 thus form a Ravigneaux gear set, a double planetary gear set.

The fourth planetary gear set P4 is composed of the common gear CG rotatably supported on the common axis line 11, the third carrier X3 rotatably supporting the fourth planet N4, and the fourth ring R4 that meshes with the common gear CG through the fourth planet N4. Accordingly, a radially inward side of the common gear CG serves as the ring gear of the Ravigneaux gear set, and a radially outward side of the common gear CG serves as the sun gear S4 of the fourth planetary gear set P4, such that the automatic transmission 10 includes an improved packaging. The fourth planetary gear set P4 may be concentric with either the second planetary gear set P2 or the third planetary gear set P3.

The planetary gear sets P1-P4 are connected by the torque-transmitting elements i.e., the first dog clutch C1, the second dog clutch C2, and the third dog clutch C3, as well as the first, the second, and the third brakes B1, B2, and B3, as shown in FIGS. 1A and 1B.

Furthermore, in the first planetary gear set P1, the first sun S1 is fixed through the third brake B3. The first carrier X1 is directly connected to the fourth ring R4 and to the output shaft 14. The first ring R1 is directly connected to the third carrier X3. The term "directly connected" indicates that two elements are coupled to each other without any intermediate clutch or brake.

In the second planetary gear set P2, the second sun S2 is fixed through the first brake B1, and the second sun S2 is connected to the input shaft 13 by engaging the first dog clutch C1. The second carrier X2 is fixed through the second brake B2.

In the third planetary gear set P3, the third sun S3 is connected to the input shaft 13 by engaging the second dog clutch C2.

In the fourth planetary gear set P4, the planetary carrier X3 is connected to the input shaft 13 by engaging the third dog clutch C3. The ring gear R4 is directly connected to the first carrier X1 and the output shaft 14.

In the automatic transmission 10 structured as described above, a rotation of the input shaft 13 is transmitted through elements of the planetary gear sets P1 to P4 and output to the output shaft 14. Selective engagement of the first to third dog clutches C1 to C3 and the first to third brakes B1 to B3 adjusts a rotation output to the output shaft 14, based on a speed selected from nine forward speeds and one reverse speed. More specifically, as shown in FIGS. 2, 3 and 4A-4K.

FIG. 2 describes a shift pattern for the automatic transmission 10. The shift pattern includes a first to ninth forward speeds and a reverse speed, each having three elements in engaged state. When only one or two of elements (i.e., the dog clutches C1-C3 and/or brakes B1-B3) are engaged, the automatic transmission is in neutral state or gear. In neutral gear, no power is transmitted from the input shaft 13 to the output shaft 14.

For example, the first forward speed of the automatic transmission 10 is reached when the second brake B2, the third brake B3, and the second dog clutch C2 are engaged to transmit torque, while the first brake B1, the first dog clutch C1, and the third dog clutch C3 are disengaged. A second forward speed is reached when the first brake B1, the third brake B3, and the second dog clutch C2 are engaged to transmit torque, while the second brake B2, the first dog clutch C1, and the third dog clutch C3 are disengaged. So, when shifting from the first forward speed to the second forward speed, the second brake B2 is disengaged and the first brake B1 is engaged. If the brakes B1 and B2 are at different speeds, a significant shock will be experience. As such, synchronization is necessary for smooth shifting.

According to an embodiment of the present disclosure, all the nine speeds and the reverse speed are achieved by synchronizing the speed of the third sun S3 with other rotating elements via the first dog clutch C1. The overall shifting pattern is explained in FIG. 3, while example synchronizations are explained for the first forward speed to the sixth forward speed with reference to FIG. 4A-4K.

Figure 3:
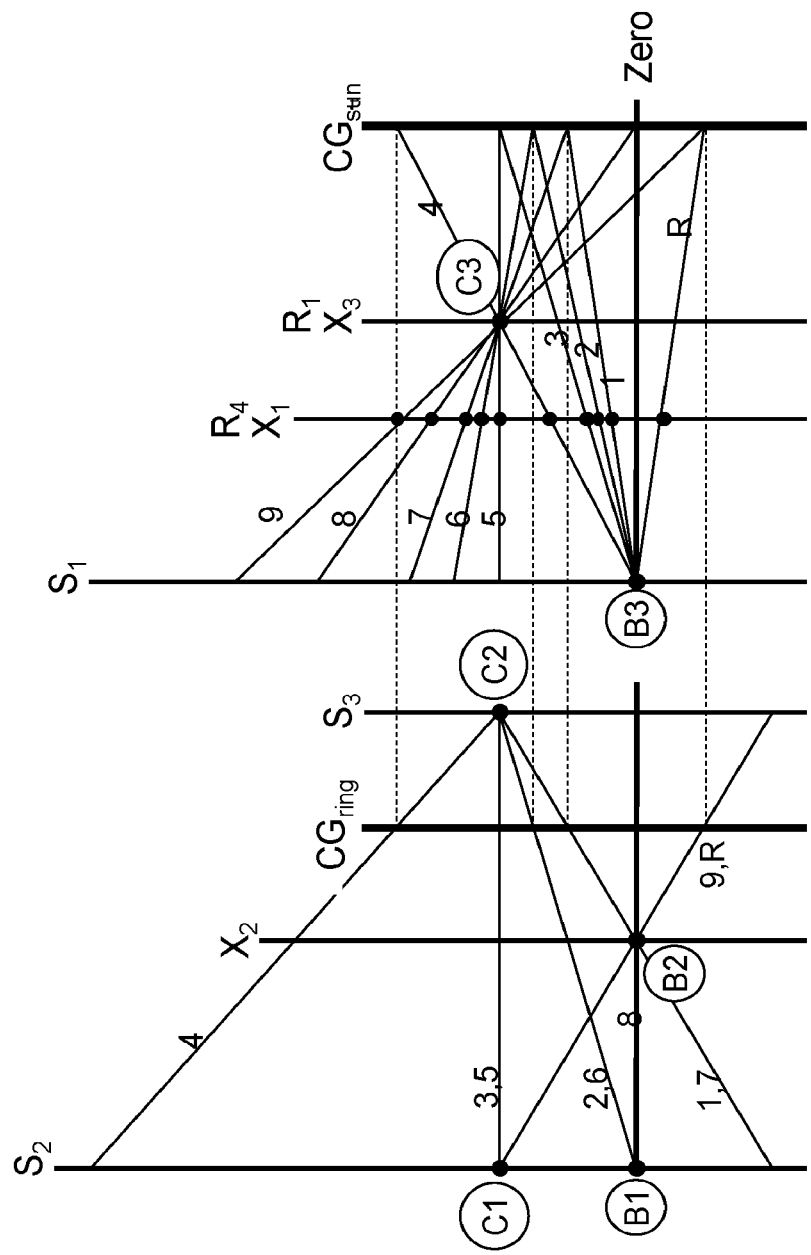
FIG. 3 is a speed diagram showing shifting processes from a first forward speed to a ninth forward speed, as well as a reverse speed, for the automatic transmission according to an exemplary embodiment of the present disclosure.

FIG. 3 is an overview speed diagram showing shifting processes from a first forward speed to a ninth forward speed, as well as a reverse speed, for the automatic transmission according to an exemplary embodiment of the present disclosure. The speed diagram establishes a speed relationship between a plurality of planetary gear sets. For example, in the first forward speed, when the second brake B2 and the third brake B3 are engaged, the speed of the second carrier X2 is zero. The input from the engine is transmitted via the second clutch C2. Thus, a steady state relationship is established on the left side of the first sun S1. For example, in a first speed, if the input is 1 rpm at C2, then the $CG_{ring}$, will rotate at approximately 0.75 rpm, the second carrier X2 is at zero speed, the second sun S2 will rotate at $-1$, where negative sign indicated rotation in opposite to the input. Similarly, on the right side, the first sun S1 is fixed at zero to establish a steady state relationship on the right side of the first sun S1. In another example, in the second speed, if the input is 1 rpm at C2, then the $CG_{ring}$ will rotate at approximately 0.75 rpm, the carrier X2 will rotate at approximately 0.5 rpm, and the second sun S2 will be at zero speed. Similarly, on the right side, the first sun S1 is fixed at zero to establish a steady state relationship on the right side of the first sun S1.

The speed diagram can vary depending on parameters such as number of planetary gear sets, connection between the planetary gear set, gear ratios, geometry of the planetary gear sets, etc. The speed relationship can be used to determine the synchronization speed at which an upshift or downshift should occur. The speed diagram also establishes speed differentials between the torque-transmitting elements that are engaged and/or disengaged in each gear of the automatic transmission 10. The speed relationship can be stored in the synchronization controller 200 and used to determine the synchronization speed during the shifting process.

Figure 4A:
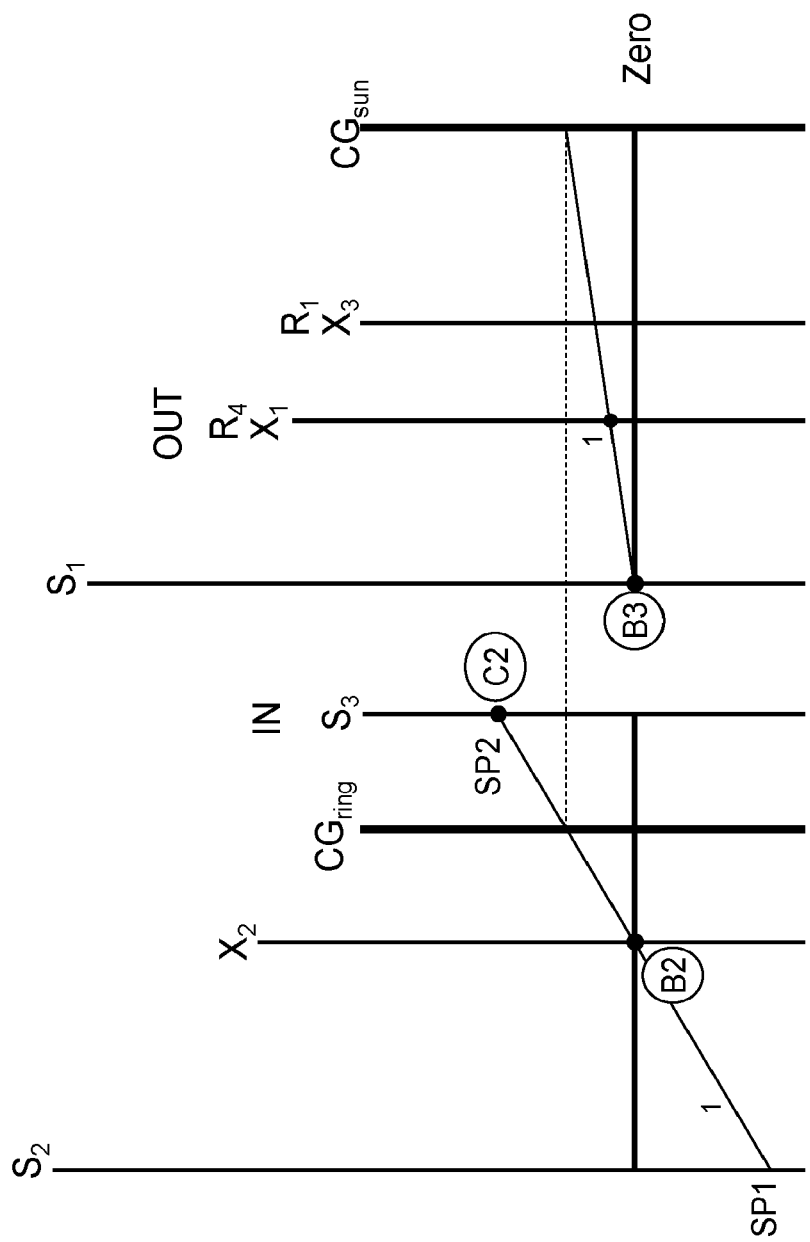
FIGS. 4A-4D are speed diagrams illustrating a shifting processes from a first forward speed to a second forward speed according to an exemplary embodiment of the present disclosure.
Figure 4B:
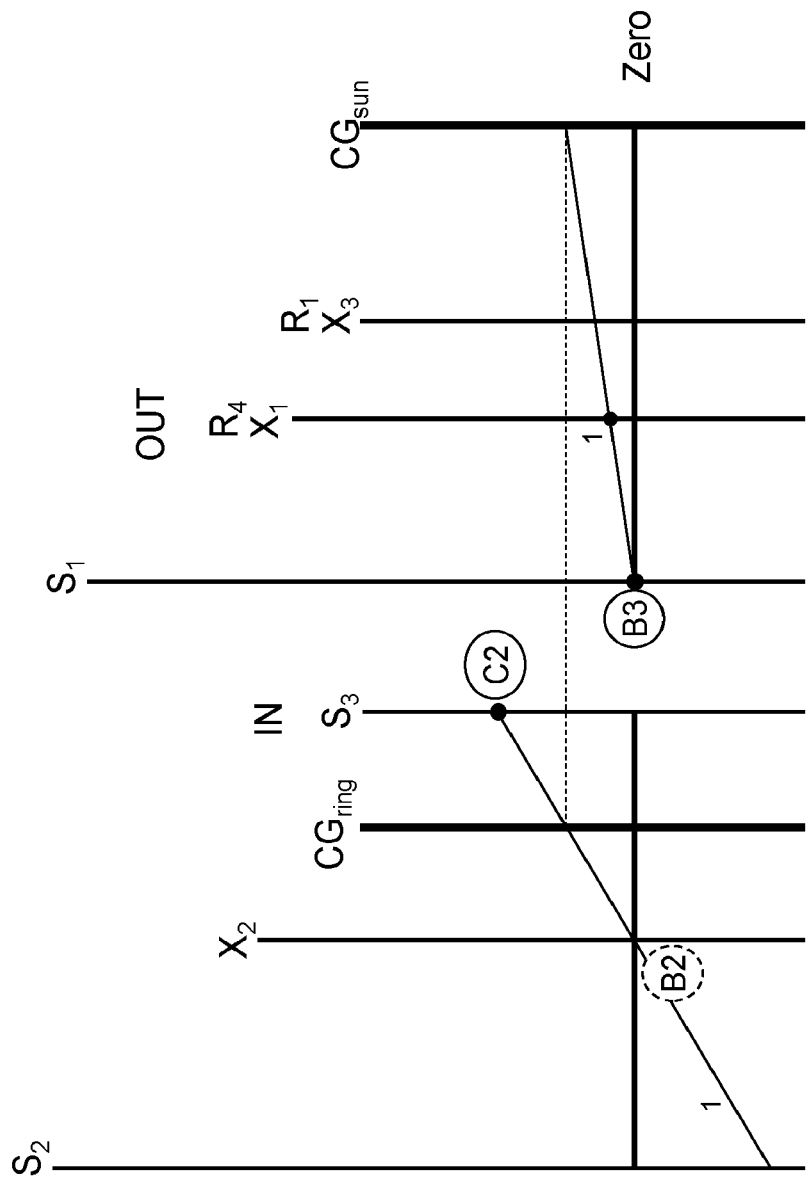

The speed diagram for the first forward speed to the second forward speed is explained with respect to FIGS. 4A-4D. FIG. 4A shows the speed diagram for the first forward speed. In the first forward speed, the second dog clutch C2, the second brake B2, and the third brake B3 are engaged. On the left side, the second sun S2 is rotating at a speed SP1, the second carrier X2 is rotating at zero speed, and the third sun S3 is rotating at a speed SP2. On the right side, the first sun S1 is stationary or rotating at zero speed, and the common gear CG have the same speed SP3 on the sun side (right side) as well as on the ring side (left side). To shift from the first forward speed to the second forward speed, the second brake B2 is released, as shown in FIG. 4B. Then, referring to FIG. 4C, the electric machine 100 slows down the speed the third sun S3 and the second dog clutch C2 till the speed of the third sun S3 is reduced from SP2 to a synchronization speed SP2' and the speed of the second sun S2 reaches a zero speed.

Figure 4C:
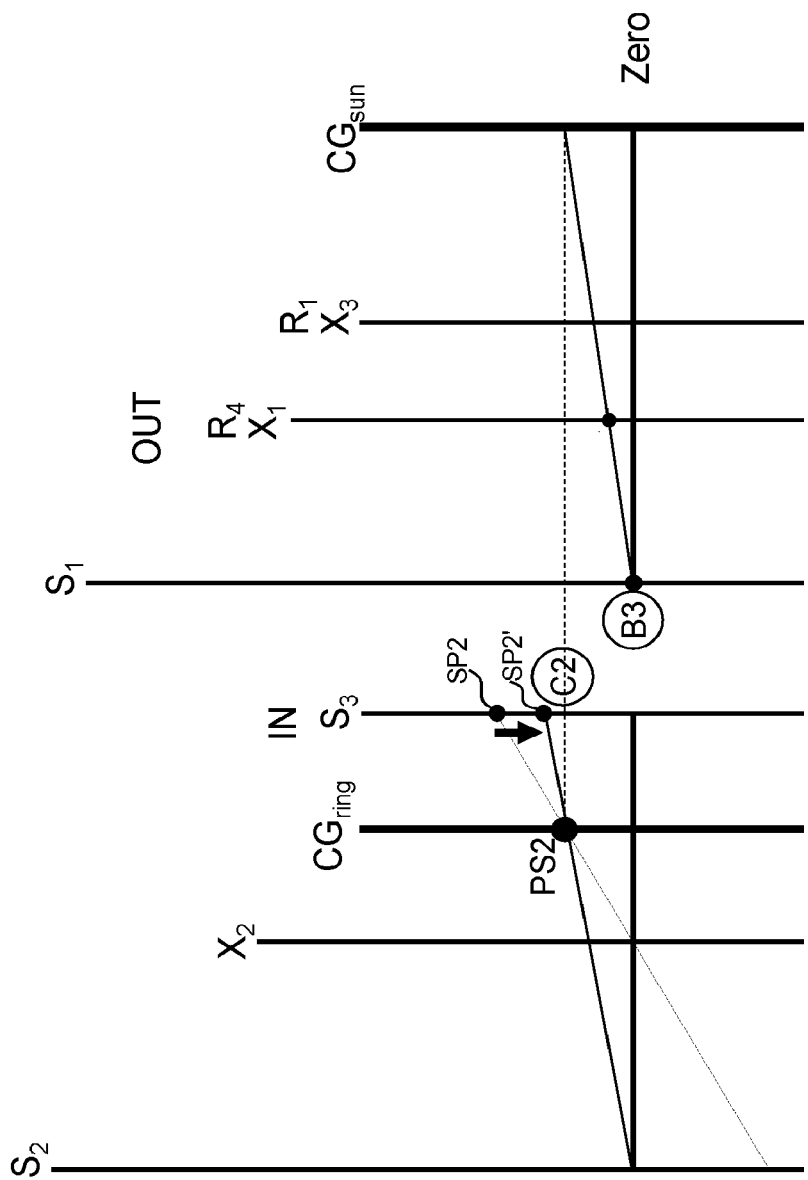

In FIG. 4C, when the automatic transmission is in neutral state, the speed of the $CG_{ring}$ is maintained at a first pivot speed PS2 due to the inertia of the vehicle. A pivot speed is a speed of an element of the planetary gear set (e.g., $CG_{ring}$ or X1) that does not change, due to inertia of the vehicle, when in neutral state. In the neutral state, the input and the output of the automatic transmission are not connected and the planetary gear sets can rotate freely. According to the present disclosure, the neutral state occurs when less than three dog clutches C1-C3 and/or brakes B1-B3 are engaged. In the neutral state, the pivot speed keeps rotating elements of the planetary gears and enables the electric motor 100 to change the speed of the element of a planetary gear and achieve synchronization speed. The pivot speed is observed during each shifting, for example, the pivot speeds PS3, PS4, PS5, PS6, PS7, PS8, and PS9, shown in FIGS. 4E-4K, respectively.

Figure 4D:
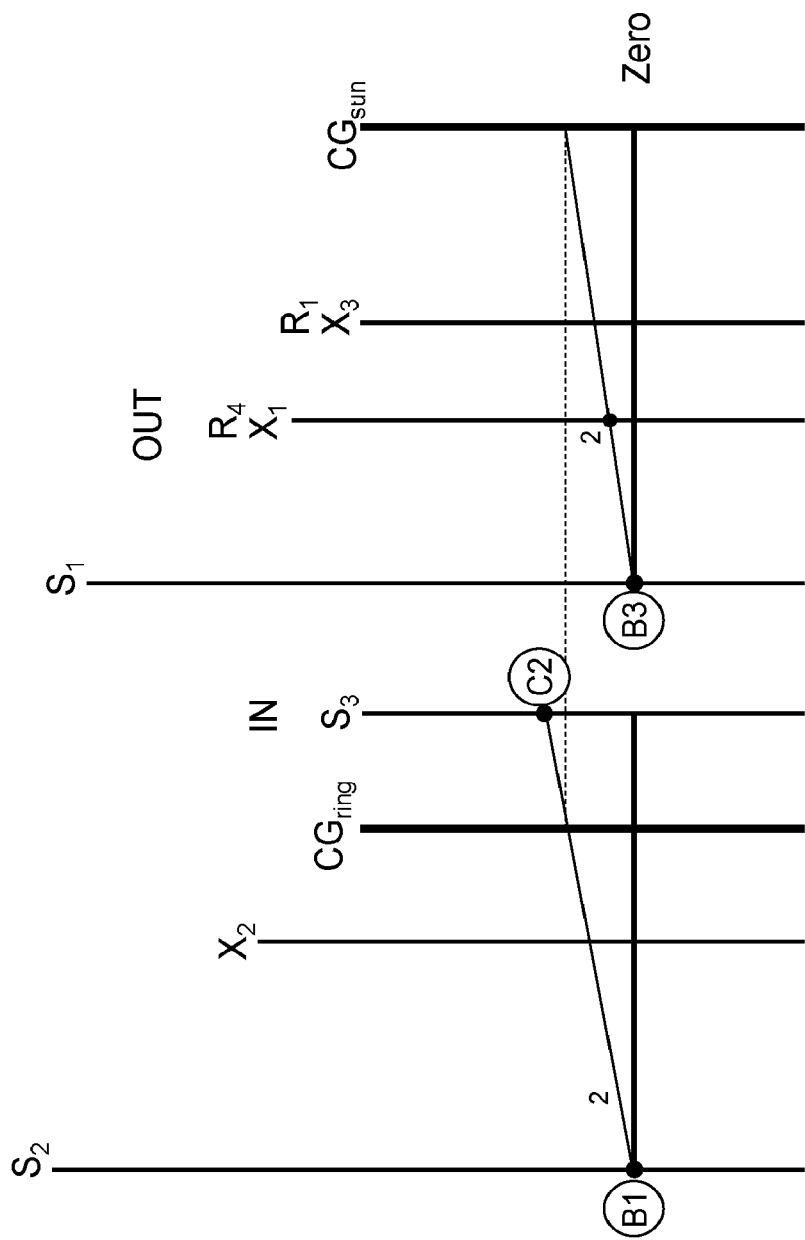

Once the speed of the second sun S2 reaches zero and the third sun S3 reaches the synchronization speed SP2', the first brake B3 is engaged to maintain the speed of the second sun S2 at zero, as shown in FIG. 4D. Thus, a smooth shifting from the first forward speed to the second forward speed is achieved by use of electric machine 100. Further, when the electric machine 100 is allowed to freely rotate, the speed of the third sun S3 increases from the synchronization speed SP2' to back to an increased speed SP2.

Similarly, the synchronization speeds are achieved by controlling the electric machine 100 for shifting from the second forward speed to the third forward speed, the third forward speed to the fourth forward speed, and so on, as shown in FIGS. 4E-4K.

Figure 4E:
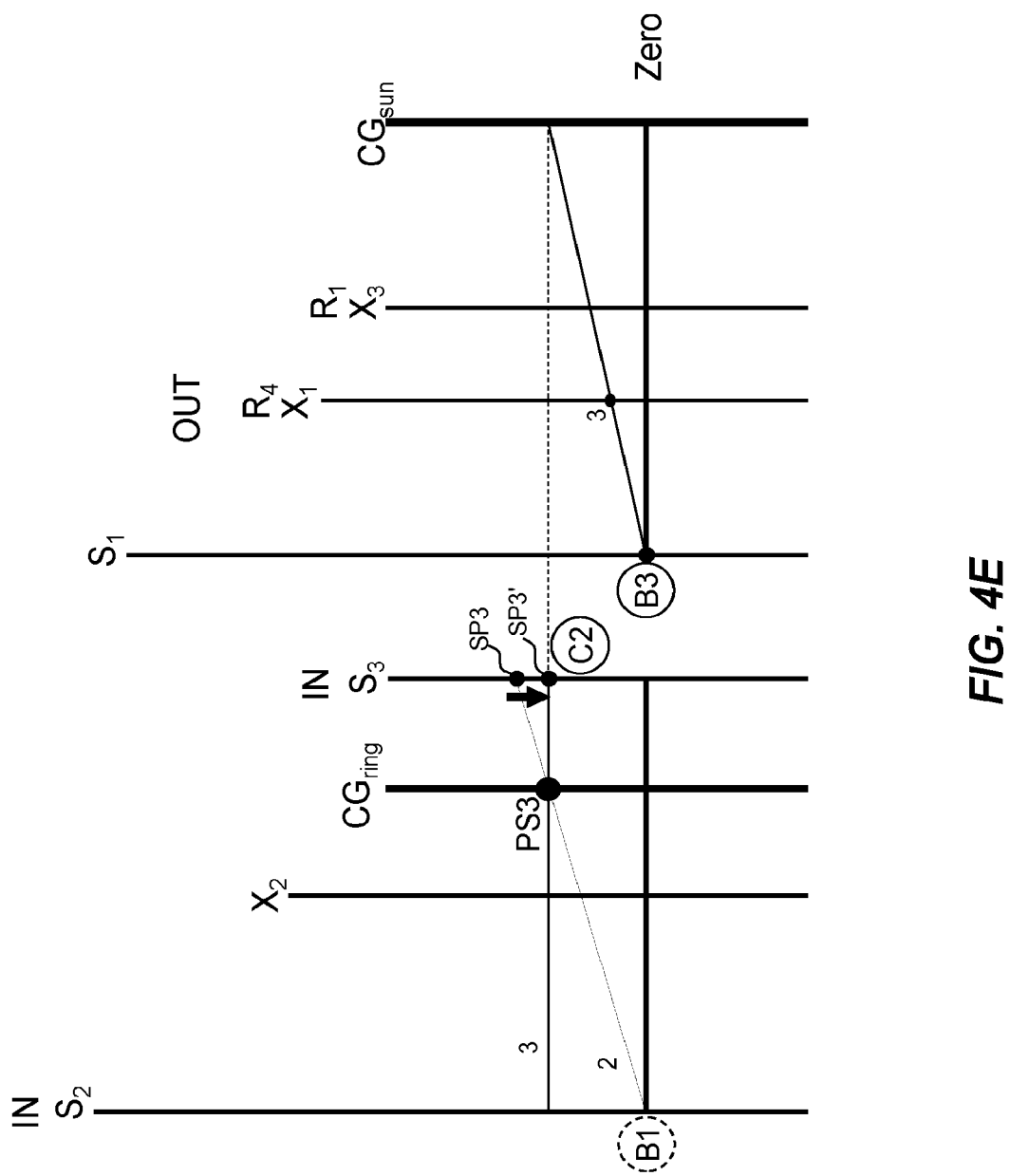
FIG. 4E is a speed diagram illustrating synchronization during a second forward speed to a third forward speed according to an exemplary embodiment of the present disclosure.

FIG. 4E illustrates synchronization during shifting from the second forward speed to the third forward speed. During shifting, the first brake B1 is released, which allows the electric machine 100 to reduce the speed of the third sun S3 from SP3 to a synchronization speed SP3'. At the synchronization speed SP3', the third sun S3 and the second sun S2 have substantially same speeds, which allows engagement of the first dog clutch C1 at the second sun S2 (not shown in FIG. 4E, refer FIG. 3).

Figure 4F:
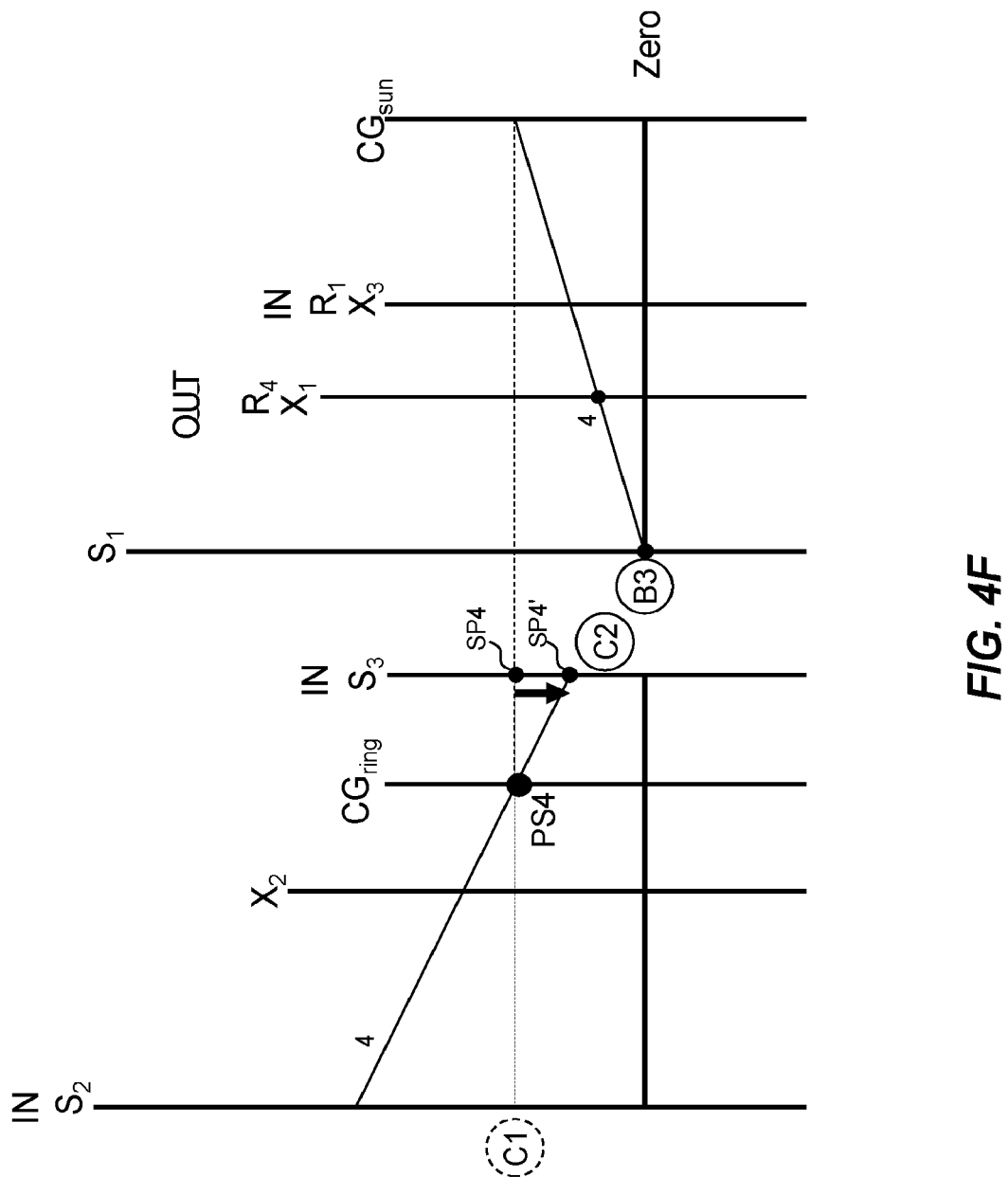
FIG. 4F is speed diagram illustrating synchronization during the third forward speed to a fourth forward speed according to an exemplary embodiment of the present disclosure.

FIG. 4F illustrates synchronization during the third forward speed to the fourth forward speed. During shifting, the first clutch C1 is released, which allows the electric machine 100 to reduce the speed of the third sun S3 from SP4 to a synchronization speed SP4'. At the synchronization speed SP4', the third sun S3, the third carrier X3 and the first ring R1 have substantially same speeds, which allows engagement of the third dog clutch C3 at the third carried X3 (not shown in FIG. 4F, refer FIG. 3).

Figure 4G:
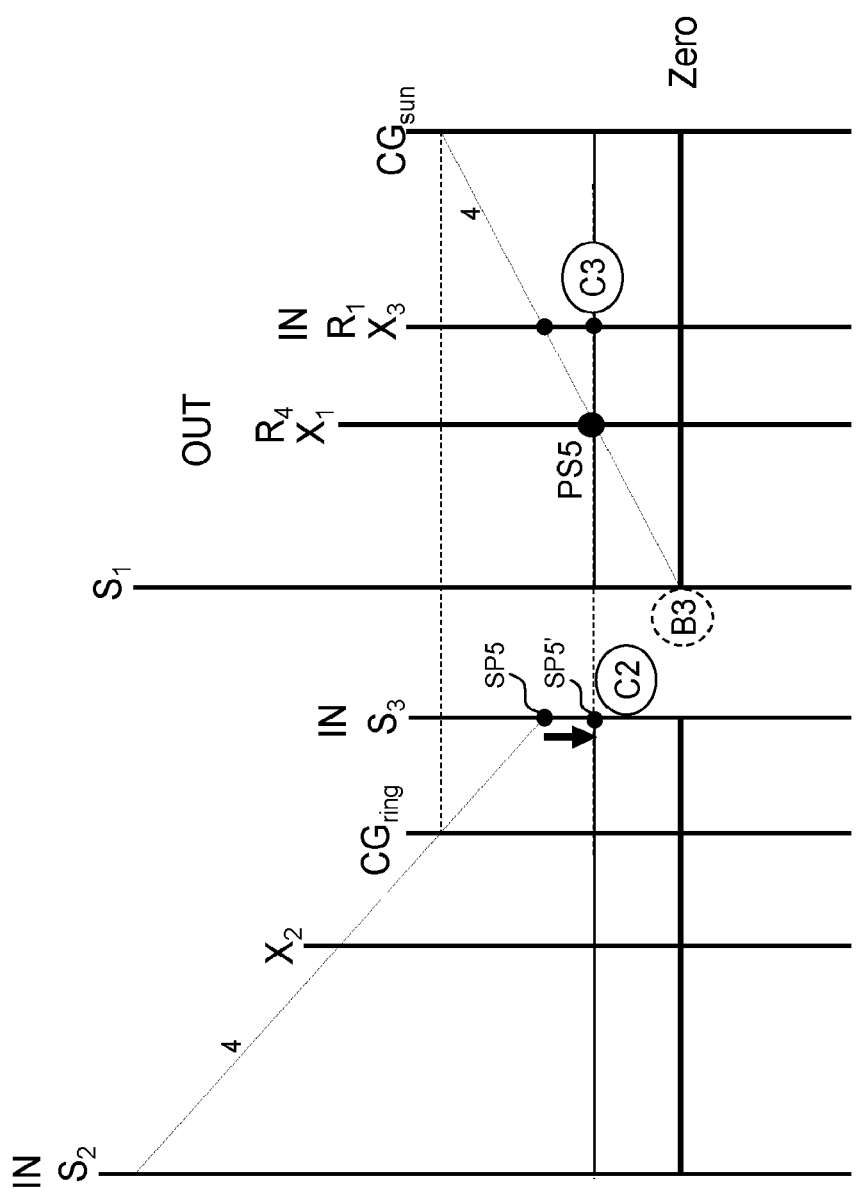
FIG. 4G is a speed diagram illustrating synchronization during the fourth forward speed to a fifth forward speed according to an exemplary embodiment of the present disclosure.

FIG. 4G illustrates synchronization during the fourth forward speed to a fifth forward speed. During shifting, the third brake B3 is released, which allows the electric machine 100 to reduce the speed of the third sun S3 from SP5 to a synchronization speed SP5' and increase the speed of the first sun S1. At the synchronization speed SP5', the third sun S3, the second sun S2, the first ring R1 and the third carrier X3 have substantially same speeds, which allows engagement of the first dog clutch C1 at second sun S2 (not shown in FIG. 4G, refer FIG. 3).

Figure 4H:
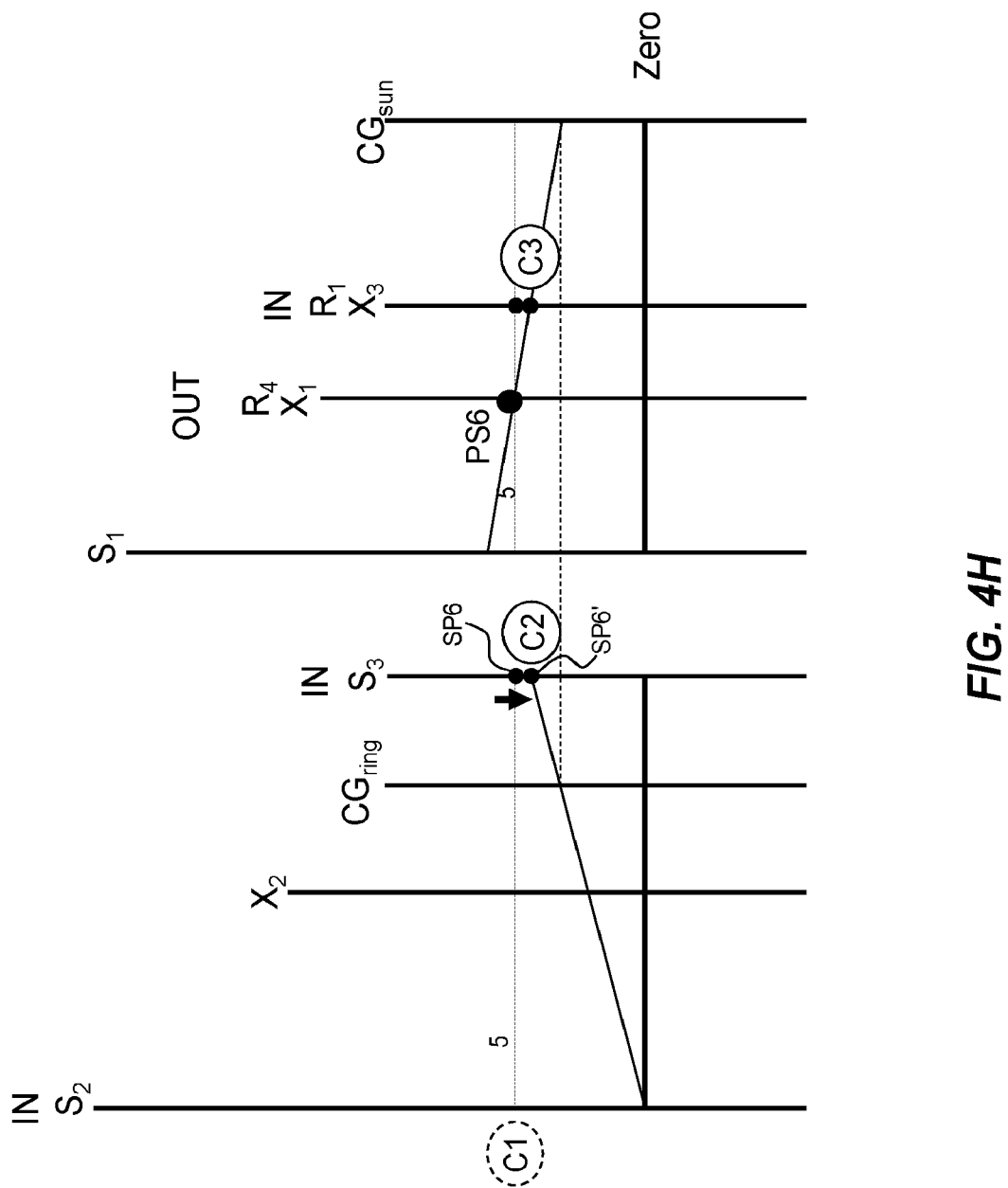
FIG. 4H is a speed diagram illustrating synchronization during the fifth forward speed to a sixth forward speed according to an exemplary embodiment of the present disclosure.

FIG. 4H illustrates synchronization during the fifth forward speed to the sixth forward speed. During shifting, the first dog clutch C1 is released, which allows the electric machine 100 to reduce the speed of the third sun S3 from SP6 to a synchronization speed SP6' and the speed of the second sun S2 drops to zero, which allows engagement of the first brake B1 at the second sun S2 (not shown in FIG. 4H, refer FIG. 3).

Figure 4I:
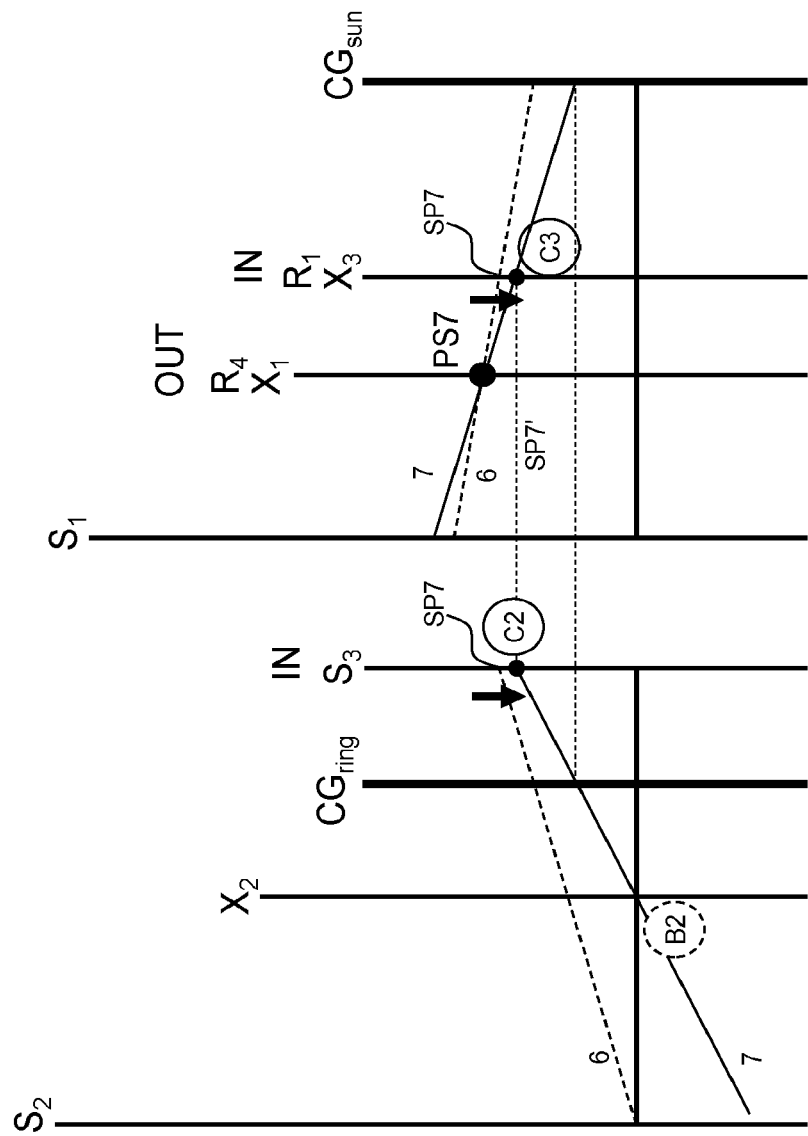
FIG. 4I is a speed diagram illustrating synchronization during the sixth forward speed to a seventh forward speed according to an exemplary embodiment of the present disclosure.

FIG. 4I is a speed diagram illustrating synchronization during the sixth forward speed to a seventh forward speed according to an exemplary embodiment of the present disclosure. During the shift, the first brake B1 is released, which allows the electric machine 100 to reduce the speed of the third sun S3 and the third carrier X3 from SP7 to a synchronization speed SP7' and the speed of the second carrier X2 drops to zero, which allows engagement of the second brake B2 at the second carrier X2 (not shown in FIG. 4I, refer FIG. 3). Further, the speed of the second sun S2 drops below zero or becomes negative (i.e., the second sun S2 starts rotating in an opposite direction compared to the input or the third sun S3).

Figure 4J:
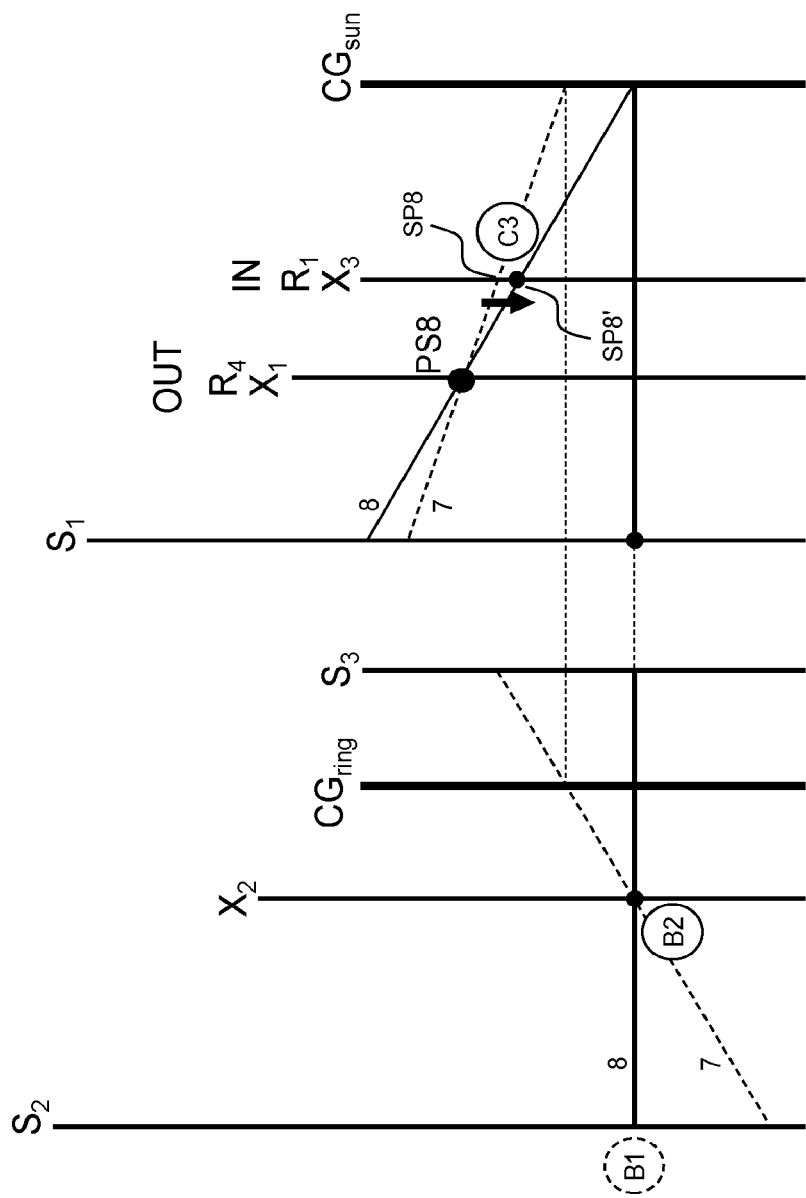
FIG. 4J is a speed diagram illustrating synchronization during the seventh forward speed to a eighth forward speed according to an exemplary embodiment of the present disclosure.

FIG. 4J is a speed diagram illustrating synchronization during the seventh forward speed to an eighth forward speed according to an exemplary embodiment of the present disclosure. During the shift, the second dog clutch C2 is released, which allows the electric machine 100 to reduce the speed of the third carrier X3 from SP8 to a synchronization speed SP8' and the speed of the common gear $CG_{sun}$, the third sun S3, and the second sun S2 drops to zero, which allows engagement of the first brake B1 at the second sun S2 (not shown in FIG. 4J, refer FIG. 3).

Figure 4K:
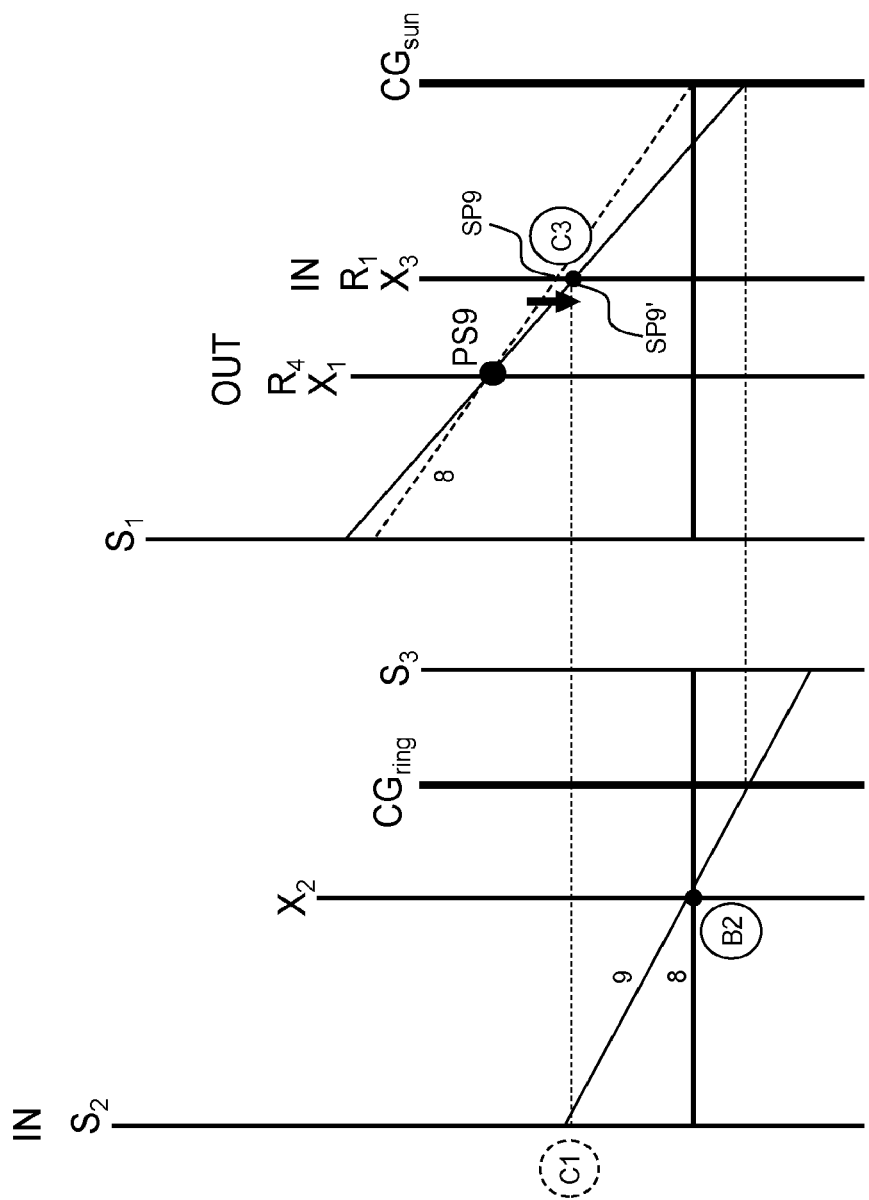
FIG. 4K is a speed diagram illustrating synchronization during the eight forward speed to a ninth forward speed according to an exemplary embodiment of the present disclosure.

FIG. 4K is a speed diagram illustrating synchronization during the eight forward speed to a ninth forward speed according to an exemplary embodiment of the present disclosure. During the shift, the first brake B1 is released, which allows the electric machine 100 to reduce the speed of the third carrier X3 from SP9 to a synchronization speed SP9' and increase the speed of the second sun S2. At the synchronization speed SP9', the second sun S2, the third carrier X3, and the input have substantially same speeds, which allows engagement of the first dog clutch C1 at second sun S2 (not shown in FIG. 4K, refer FIG. 3).

As such, according to one embodiment of the present disclosure, the electric machine 100 can control the speed of the third sun S3, the third carrier X3, or both S3 and X3 simultaneously to achieve synchronization speed. Alternatively or in addition, the electric machine 100 can be configured to control the speed of other elements (e.g., the second sun S2) of the planetary gears P1-P4 to achieve synchronization speed.

In the above examples, the zero speed of the second sun speed S2 can be an example of the first sync speed (discussed earlier) and the synchronization speed SP2', SP3', SP4' and SP5' can be examples of the second sync speeds. At such synchronization speeds, the engagement of the brakes and clutches is smooth and jerk free. Also, no slipping of clutches is utilized to provide smooth and jerk free engagements, as opposed to when wet clutches are used.

Figure 5:
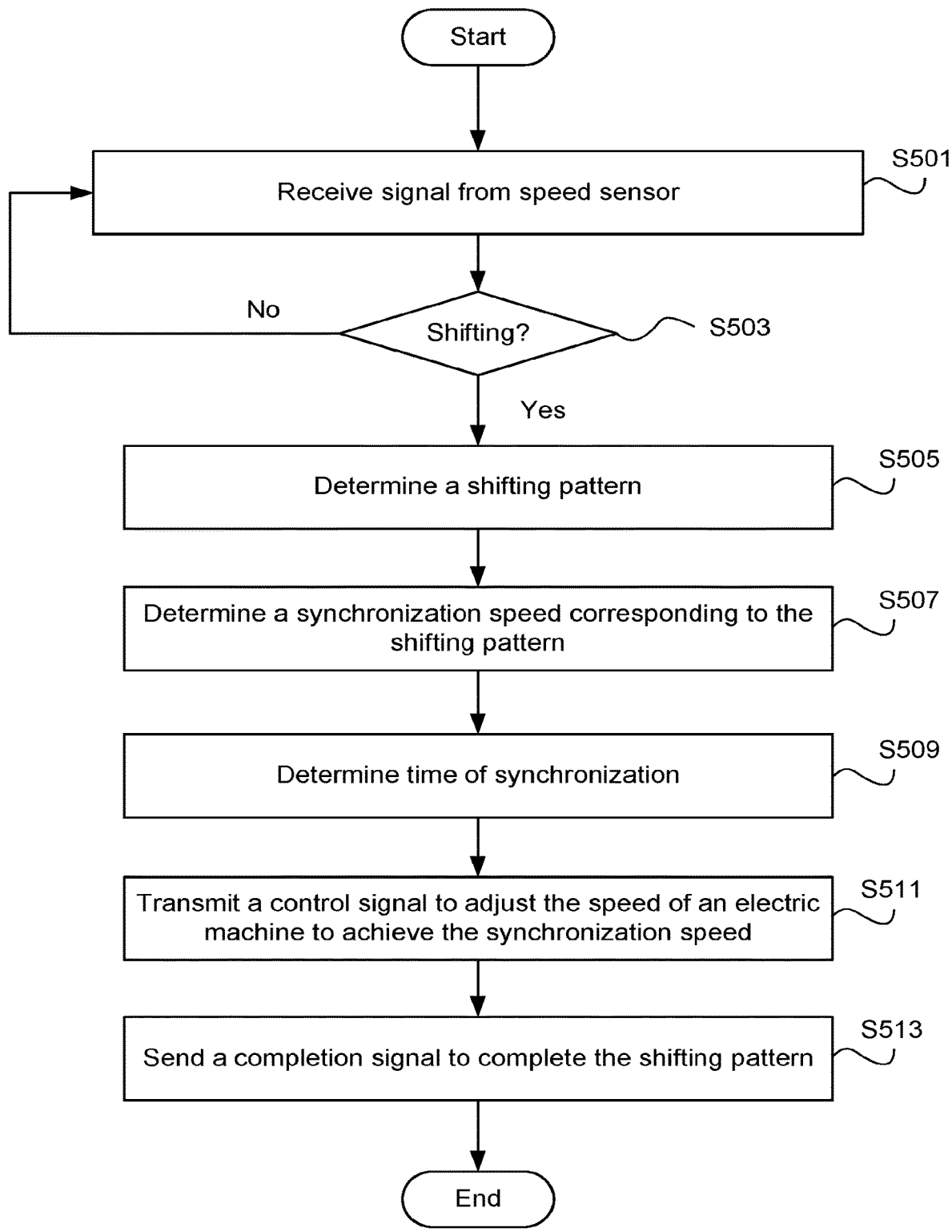
FIG. 5 is a flow chart illustrating a synchronization process according to an exemplary embodiment of the present disclosure.

FIG. 5 is a flow chart illustrating a synchronization process according to an exemplary embodiment of the present disclosure. The process begins when the engine of the vehicle is started. In step S501, the synchronization controller 200 receives speed data from the speed sensors. For example, the speed sensors 101 and 104 provide speed of the electric machine 100 and the output shaft 14, respectively to the synchronization controller 200. Alternatively or in addition, the speed sensors can be coupled to the input shaft 13 and/or the intermediate shaft 15.

In step S503, the synchronization controller 200 determines whether a shifting initiated. The synchronization controller 200 can communicate with, for example, a gear shifter or the electronic control unit (ECU) of the vehicle, to determine if the shifting from one forward speed to another or to reverse speed initiated. The shift can be an upshift or a downshift. Alternatively, the determination of shifting can be based on the speed and acceleration of the vehicle. If the vehicle accelerates and the speed increases an up-shift may be necessary. Similarly, if the vehicle decelerates or the speed decreases a down-shift may be necessary. The upshift or downshift can be initiated based on a speed threshold. The speed threshold indicates an upshift is necessary when accelerating or a downshift is necessary when decelerating.

In step S505, the synchronization controller 200 determines the shifting pattern, as illustrated in FIG. 2. For example, when shifting to the second forward speed, the shifting pattern includes engagement of the second dog clutch C2, the first brake B1, and the third brake B3.

In step S507, the synchronization controller 200 determines the synchronization speed corresponding to the shifting pattern. For example, when shifting to second forward speed the synchronization speed at the third sun S3 can be SP2', as discussed with respect to FIG. 4C.

In step S509, the synchronization controller 200 can communicate with, for example, the ECU, to determine the time at which the automatic transmission 10 is ready to be synchronized. For example, the synchronization can occur when the second brake B2 is released, as shown in FIG. 4B. Then, in step S511, the synchronization controller 200 transmits a control signal via a network to adjust the speed of the electric machine 100 to achieve the synchronization speed, as discussed with respect to FIGS. 4C, 4E, 4F, 4G, and 4H. Once the synchronization speed is reached, the synchronization controller 200 can send a completion signal, for example, to the ECU, to complete the shifting pattern. For example, the completion signal can be engaging the first brake B1, as discussed with respect to FIG. 4D.

Figure 6:
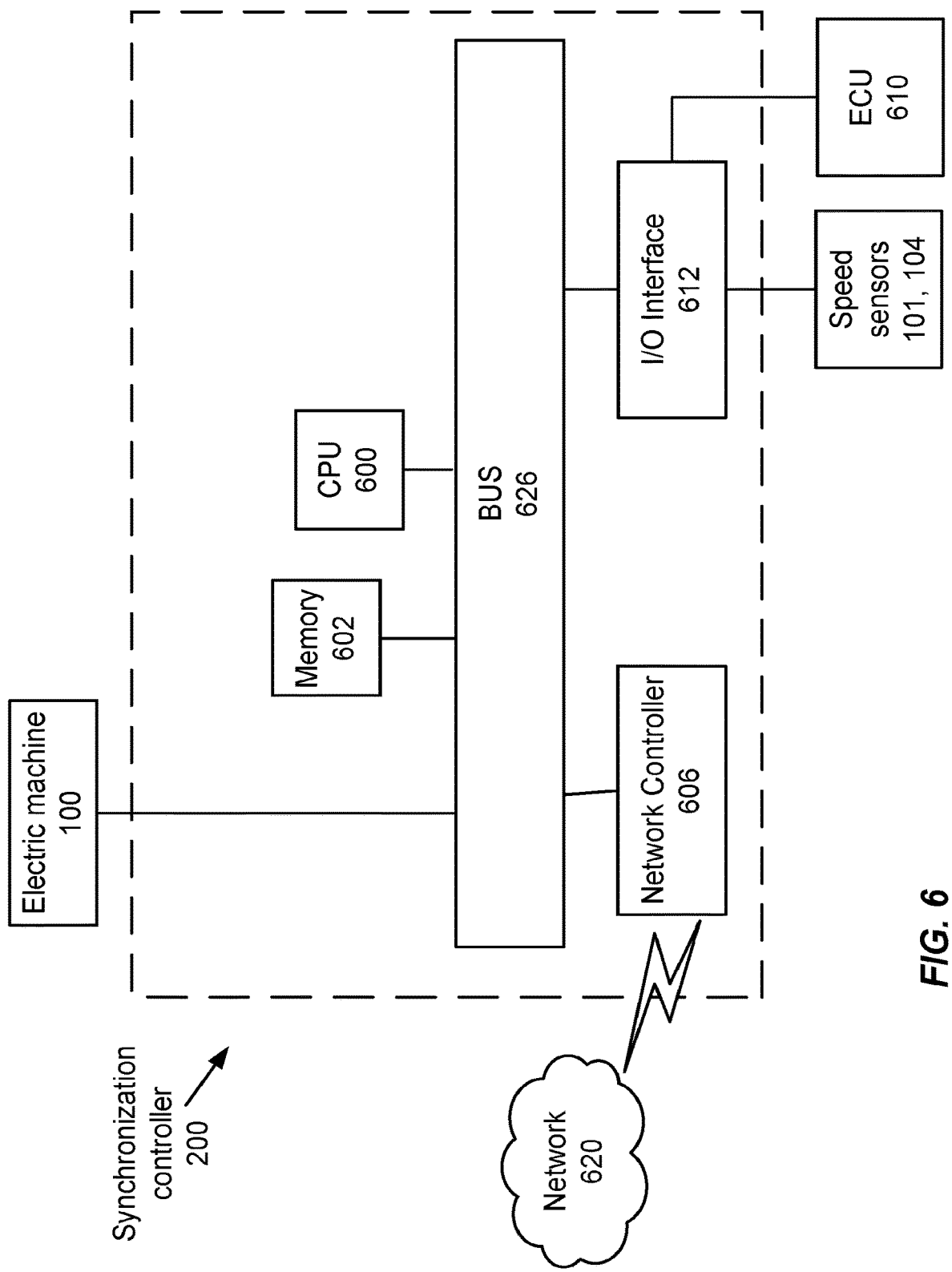
FIG. 6 is a detailed block diagram of an exemplary synchronization controller according to an exemplary embodiment of the present disclosure.

FIG. 6 is a detailed block diagram of an exemplary synchronization controller 200. In FIG. 6, the synchronization controller 200 includes a CPU 600 which performs the processes described in the present disclosure. The process data and instructions may be stored in a memory 602. The hardware elements in order to achieve the synchronization controller 200 may be realized by various circuitry elements, known to those skilled in the art. For example, CPU 600 may be a Xenon or Core processor from Intel of America or an Opteron processor from AMD of America, ASIC, or may be other processor types that would be recognized by one of ordinary skill in the art. Further, CPU 600 may be implemented as multiple processors cooperatively working in parallel to perform the instructions of the processes with respect to FIGS. 3, 4A-4K, and 5.

The synchronization controller 200, in FIG. 6, also includes a network controller 606 for interfacing with a network 620. The synchronization controller 200 can communicate with external devices such as a smart phone or a tablet, or an electronic control unit 610 (ECU 610) of the vehicle via the network controller 606.

An I/O interface 612 interface can be used to connect with the speed sensors 101 and 104. The I/O interface can also connect to a variety of sensors as necessary.

Furthermore, the synchronization controller 200 can communicate with the electric machine 100 via the bus 626. Alternatively or in addition, the synchronization controller 200 can communicate via the network 620, for example, to issue rotation commands.

The automatic transmission 10 of the present disclosure eliminates hydraulic components (wet clutch discs/plates, clutch pistons, balancer pistons, return springs, valvebody, solenoids. etc.) necessary to shift gears in order to substantially improve the transmission efficiency. All wet clutches are replaced with a dog clutches which can be electromechanically turned "on" (engaged) or "off" (disengaged) to shift gears. To enable smooth shifting, the dog clutches must be synchronized with high accuracy, achieved by the electric machine 100 according to the present disclosure. Furthermore, with the hydraulic components the shifting can take longer as their reaction time is longer. Thus, eliminating the hydraulic component and use of electric machine 100 can also allow faster shifting.

The automatic transmission 10 of the present disclosure improves the efficiency over current technology for three main reasons: 1) the automatic transmission 10 eliminates the drag and/or heat due to use of wet plate clutches. The wet plate clutches effectively synchronize speed between two rotating automatic transmission components (such as a sun gear and a planetary carrier). However, the wet plate clutches create drag/heat during the shift synchronization as well as while running open (disengaged state). In contrast, a dog clutch is an on/off type of device that does not create drag/heat during a shift as well as while running open, 2) the automatic transmission 10 reduces or eliminates the complex hydraulic system including a valve body, solenoids, oil pump, oil passages, etc. that are necessary to shift gears in the conventional technology, and 3) the automatic transmission 10 maintains or improves shift speed and feel (smooth shifting with minimal to no jerk) by utilizing the electric machine to synchronize two rotating components of the automatic transmission.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. An automatic transmission, comprising:
   an input shaft;
   an output shaft;
   an intermediate shaft coaxially aligned between the input shaft and the output shaft;
   a plurality of planetary gear sets including first, second, third, and fourth planetary gear sets that are each axially arranged on a common axis line of the automatic transmission,
   the first planetary gear set including
     a first sun rotatably supported on the common axis line,
     a first planet,
     a first carrier rotatably supporting the first planet, and
     a first ring that meshes with the first sun through the first planet,
   the second planetary gear set including
     a second sun rotatably supported on the common axis line,
     a second planet,
     a second carrier rotatably supporting the second planet, and
     a common gear that meshes with the second sun through the second planet,
   the third planetary gear set including
     a third sun rotatably supported on the common axis line,
     a third planet which is shorter than the second planet, the second carrier rotatably supporting the third planet, and
     the common gear that meshes with the third sun through the second planet and
   the third planet,
   the fourth planetary gear including
     the common gear rotatably supported on the common axis line,
     a fourth planet,
     a third carrier rotatably supporting the fourth planet, and
     a fourth ring that meshes with the common gear through the fourth planet;
   a plurality of dog clutches coupled to the plurality of planetary gear sets, the plurality of dog clutches including first, second, and third dog clutches;
   a plurality of brakes coupled to the plurality of planetary gear sets, the plurality of brakes including first, second, and third brakes;
   an electric machine coupled to the plurality of dog clutches, the plurality of brakes, and the plurality of planetary gear sets;
   a first speed sensor measuring a first speed of the electric machine and a second speed sensor measuring a second speed of the output shaft; and
   a synchronization controller configured to:
     receive the first speed sensor data and the second speed sensor data,
     determine a synchronization speed of one of the third sun or the third carrier that synchronizes a speed of the third sun or the third carrier with a speed of at least one other rotating element of the plurality of planetary gear sets, and
     adjust the first speed of the electric machine to the synchronization speed to control the speed of the third sun or the third carrier, the electric machine being coupled to the at least one other rotating element of the plurality of planetary gear sets via the third sun or via the third carrier,
   wherein all speeds of the automatic transmission are achieved by synchronizing the speed of the third sun of the third carrier,
   wherein the automatic transmission is free of hydraulic components for shifting gears,
   wherein the first sun is fixed through the third brake,
   wherein the second sun is fixed through the first brake, and the second sun is connected to the input shaft by engaging the first dog clutch,
   wherein the third sun is connected to the input shaft by engaging the second dog clutch, and
   wherein the third carrier is connected to the input shaft by engaging the third dog clutch.

2. The automatic transmission according to claim 1, wherein the electric machine is coupled to the first dog clutch via the intermediate shaft.

3. The automatic transmission according to claim 1, wherein the electric machine is coupled to the first dog clutch via the input shaft.

4. The automatic transmission according to claim 1, wherein the synchronization speed is determined based on a speed relationship established between the plurality of planetary gear sets.

5. The automatic transmission according to claim 4, wherein the synchronization speed is a first sync speed, and the first sync speed is a zero rotational speed to allow engaging or disengaging of at least one of the plurality of brakes or the plurality of dog clutches.

6. The automatic transmission according to claim 5, wherein the first sync speed is achieved by adjusting the speed of the third sun via the electric machine.

7. The automatic transmission according to claim 6, wherein the engaging or disengaging of at least one brake of the plurality of brakes is determined based on a shifting pattern.

8. The automatic transmission according to claim 4, wherein the synchronization speed is a second sync speed, and the second sync speed is a rotational speed greater than zero to allow engaging or disengaging of at least one dog clutch of the plurality of dog clutches.

9. The automatic transmission according to claim 8, wherein the second sync speed is achieved by adjusting the speed of the third sun via the electric machine.

10. The automatic transmission according to claim 8, wherein the engaging or disengaging of at least one dog clutch of the plurality of dog clutches is determined based on a shifting pattern.

11. The automatic transmission according to claim 1, wherein the first carrier is directly connected to the fourth ring and to the output shaft, the first ring is directly connected to the third carrier, and the second carrier is fixed through the second brake.

* * * * *